(12) United States Patent
Panic (10) Patent No.: US 11,474,121 B2
(45) Date of Patent: Oct. 18, 2022

(54) AUTOMATED VOLUME SAVING LIQUID EXCHANGE DEVICE IN A SINGLE ROTATING CYLINDER

(71) Applicant: SMARTRESEARCH DOO BEOGRAD-ZVEZDARA, Belgrade (RS)

(72) Inventor: Marko Panic, Belgrade (RS)

(73) Assignee: SMARTRESEARCH DOO BEOGRAD-ZVEZDARA, Belgrade (RS)

( * ) Notice: Subject to any disclaimer, the term of this patent is extended or adjusted under 35 U.S.C. 154(b) by 0 days.

(21) Appl. No.: 17/608,902

(22) PCT Filed: May 20, 2019

(86) PCT No.: PCT/RS2019/000017
§ 371 (c)(1),
(2) Date: Nov. 4, 2021

(87) PCT Pub. No.: WO2020/236022
PCT Pub. Date: Nov. 26, 2020

(65) Prior Publication Data
US 2022/0206027 A1 Jun. 30, 2022

(51) Int. Cl.
| | |
|---|---|
| C12M 1/00 | (2006.01) |
| G01N 35/10 | (2006.01) |
| G01N 1/31 | (2006.01) |
| G01N 1/30 | (2006.01) |
| G01N 35/00 | (2006.01) |

(52) U.S. Cl.
CPC ........... *G01N 35/1002* (2013.01); *G01N 1/30* (2013.01); *G01N 1/31* (2013.01); *G01N 35/1016* (2013.01); *G01N 2035/00524* (2013.01)

(58) Field of Classification Search
None
See application file for complete search history.

(56) References Cited

U.S. PATENT DOCUMENTS

| | | | |
|---|---|---|---|
| 2004/0029284 A1 | 2/2004 | Hess et al. | |
| 2013/0248370 A1* | 9/2013 | Asztalos | G01N 33/6842 204/614 |
| 2014/0293733 A1 | 10/2014 | Hart et al. | |
| 2015/0285790 A1 | 10/2015 | Tian et al. | |

* cited by examiner

*Primary Examiner* — Jyoti Nagpaul
(74) *Attorney, Agent, or Firm* — The Watson IP Group, PLC; Jovan N. Jovanovic (57) ABSTRACT

The present invention provides a device and a method for automated liquid exchange in a horizontally rotating container that may be applied in automated sample treatment by using chemical solutions, in sequential order. Such applications include biomolecule staining on solid support or fixed samples such as western blot or tissue slice processing. Such sequential chemical reactions are usually performed on flat surfaces. Alternatively, these reactions can be completed with much less volume of reagents in horizontally rotating containers. Yet, it is difficult to automate these processes in rotating containers since the required tubing would twist due to the continuous rotation of the container. The present invention solves the problem of twisting of tubing by leading them through a stationary tubing carrier that passes through the rotating container. Hence, the rotation of the tubing, and therefore twisting, is avoided, thus enabling automated liquid exchange of various chemical solutions in rotating containers.

10 Claims, 6 Drawing Sheets

AUTOMATED VOLUME SAVING LIQUID EXCHANGE DEVICE IN A SINGLE ROTATING CYLINDER

TECHNICAL FIELD

The present invention relates to an automated and/or semi-automated device and a method for sequential treatment of samples with different liquids, e.g. chemical solutions such as buffers, organic solvents, etc. Specifically, the present invention is focused on use of the device in automated blot-based assays, such as western blot.

BACKGROUND OF THE INVENTION

Staining of biomolecules on solid support or in fixed samples is commonly used in biology, biochemistry and related fields, to detect or visualize a specific biomolecule of interest. A typical example of specific biomolecule staining on a solid support would be western-, northern- or Southern blot. These methods usually include the separation of biomolecules of interest, immobilization of separated biomolecules of interest on a membrane, and subsequent sequential treatment of the membrane with various chemical solutions to detect the molecule of interest. For example, in western blot (immunoblot) assays, the membrane is typically treated with the following chemical solutions and buffers: blocking buffer (to block the membrane for unspecific protein binding), washing buffer (several times to remove the blocking buffer), primary antibody solution (primary antibody binds to the protein of interest), washing buffer (several times to remove the primary antibody solution), secondary antibody (binds to primary antibody, usually coupled with horseradish peroxidase or fluorescent fluorophores to enable the detection of the protein of interest), and washing buffer (to remove the unbound secondary antibody). The protocol may vary and some steps can be either skipped or altered depending on the specific application. Nevertheless, a typical protocol involves dozens of incubation steps. For this reason, blotting based assays are time consuming (may last from 4 hours to 16 hours) and subject to human error, if done manually. Several different types of devices that automate membrane processing for blot-based assays have been described and some are commercially available. One type of devices uses trays to incubate the membranes. For instance GoBlot from Cytoskeleton, or BlotCycler from Advanced Biosystems incubate the membranes in trays. The disadvantage of incubating the membranes in horizontal trays compared to curved surfaces or cylinders is the fact that trays require much more volume of reagents to cover the membrane in order for the sample to be treated, as compared to rotating cylinders. For example, in order to incubate the membrane having a size of 9×6 cm, typically it is required to use 10 ml to 15 ml of a reagent, in order to completely cover the membrane. On the other hand, treating a membrane in a curved tray or cylinder would require from 3 to 5 ml of a reagent. An alternative device was described in U.S. Pat. No. 9,121,795B2 in which concave trays are used to store the appropriate chemical solutions and an appropriate cylinder-like perforated container to dip the samples in the concave tray. In such a device, every reagent is stored in a separate concave tray. This type of device uses low amounts of reagents for each step of the reaction and does not require additional non-reusable consumables. The issue with this device is that its programming is limited by the hardware used, or by the number of concave trays within the device. On the other hand, a device called BlotBot (Next Advance) also uses concave trays as incubation chambers, but all steps are performed in a single tray and the reagents are dispensed (added) and removed in sequential order from the single concave tray. Therefore, BlotBot not only uses less volume of reagents for each step, but is also easier to be programmed since it is not limited by its hardware and the number of trays. However, although the use of concave trays reduces the volume of chemical solutions used in BlotBot, it does not solve the other pitfall of automating blot membrane processing in trays, as the device still requires substantial time to be cleaned manually. The issue of manual cleaning is solved in a completely different design of automated blot processors that can be observed in iBind from Thermo Fischer Scientific. Namely, iBind uses cartridges for lateral flow technology to achieve low antibody consumption, and since the cartridges are disposable and non-reusable, there is no need for manual cleaning of the device. Although the disposable cartridges are convenient, they are relatively expensive, non-reusable and need to be purchased for each use of the iBind device. Yet, purchasing these cartridges on a regular basis is not affordable for most laboratories that perform blot-based experiments and even more, adds an additional level of complexity to the logistics operations in the laboratory since the experiments and therefore use of cartridges need to be planned and accounted for in advance.

Thus, there is a need to provide simple, affordable, and easy to program and handle devices for the automated processing of immobilized biomolecules on a solid support or in fixed samples. Here we disclose a device that requires significantly lower amount of reagents (from 3 to 5 ml) for the sample to be treated when compared to the standard volumes used in conventional trays (from 10 to 15 ml). This is achieved due to the sample, e.g. membrane, being treated in a closed rotating container, i.e. cylinder. Moreover, the device according to the present invention can be programmed relatively simply, since the chemical solutions used in the process of incubation are directly pumped into the cylinder. In addition, the device does not require any consumable hardware and has a self-cleaning protocol that avoids cross-contamination between experiments. Furthermore, the device enables time saving and increased efficiency for the user. For example, the user can prepare the device with all required reagents (blocking buffer, washing buffer, primary and secondary antibody solution) and use the appropriate program. The user can subsequently insert the membranes into the device. Afterwards, the device can automatically incubate the western blot membranes according to the user's instructions, providing the user with valuable "walk away time" to perform other tasks. Hence, the use of the device according to the present invention may save the user typically up to 4 hours of work per experiment or measurement.

TECHNICAL PROBLEM

The object of the present invention is to overcome the above mentioned deficiencies of the prior art, by providing an automated device for efficient dispensing and removal of the reagents. Furthermore, the device enables significant reduction of required volume of reagents used to treat the sample when compared to the volumes typically used in the prior art. Even more, the device is reusable without a requirement for any consumable materials. This is achieved by performing the reactions inside a single rotating cylindrical container. Thus, the present invention provides the method for processing samples, such as blotting membranes or tissue slices. The present disclosure, as an example, provides the description of the incubation process of the western blot membrane, using the device according to the present invention.

DISCLOSURE OF INVENTION

The device according to the present invention comprises at least one reaction vessel assembly, and means for dispensing at least one fluid, such as buffer, inside the reaction vessel assembly. The reaction vessel assembly comprises at least one rotating cylindrical container. The rotating cylindrical container may be any type of container having the shape of a hollow cylinder. The reaction vessel assembly further comprises at least one carrier having at least one hollow axle attached to the carrier. Each hollow axle has a rotating cylindrical container coupled to it. This enables a coaxial rotation of the rotating cylindrical container, i.e. the cylinder around the hollow axle. The rotating cylindrical container serves as the reaction vessel or the incubation chamber. The reagents can be pumped to the rotating cylindrical container using appropriate tubing, typically connected to a pump. The appropriate tubing is guided to the cylinder through the tubing carrier which is placed inside the hollow axle and passes through the hollow axle and is attached to it (FIG. 2B). Therefore, the carrier, the hollow axle and the tubing carrier enclosing the appropriate tubing, are in a stationary position relative to each other. On the other hand, the rotating cylindrical container, i.e. cylinder, is free to rotate coaxially around the hollow axle. Since the tubing carrier is stationary, there is no rotation of the tubing in the tubing carrier. Therefore, the entanglement and twisting of the appropriate tubing is avoided. This further allows the development of the method, that includes the use of the disclosed device, that can be carried out automatically.

The carrier of the reaction vessel assembly according to the present invention is provided with means, such as a motor, preferably electrical motor, for powering the rotation of the rotating cylindrical container.

Furthermore, the reaction vessel assembly can be equipped with a rocking motion mechanism that enables the reaction vessel assembly to be agitated or rocked.

The present invention was experimentally tested for automated western blot membrane processing. The method disclosed in the present invention improves productivity in life science laboratories since it provides the user with time saving, but also reduces the possibility for human error. Furthermore, the method according to the present invention does not require any consumable material, since the device can be programmed such as to provide a self-cleaning protocol. Therefore, the potential cross-contamination is avoided.

BEST MODES FOR CARRYING OUT OF THE INVENTION

The present invention in one aspect provides a device and a method for automated processing of samples, particularly biological samples such as membranes for western-, northern-, and Southern blot, as well as thin tissue samples in histological and histopathological analysis. In another aspect, the invention can be used to sequentially treat samples with various chemical solutions, such as for, but not limited to, film and photography processing, staining of electrophoresis gels, tissue samples and tissue slice processing. The device and the method as disclosed here provide an automated, efficient, programmable and cost effective alternative to the standard labor intensive sequential chemical treatment of thin samples i.e. samples having form of a thin layer or a film e.g. blot assay membranes.

Various modifications to the disclosed device will be readily apparent to those skilled in the art and the generic principles herein may be applied to other embodiments and combinations thereof. Various components are discussed in the context of the particular initial design. It should be understood that the various elements can be altered and even replaced or omitted to permit other designs and functionality. Thus, the present description is not intended to be limited to the embodiments shown but is to be acknowledged as the widest scope consistent with the principles and features described herein.

By biological sample, it is referred to any sample containing biomolecules. By biomolecules, it is referred to any organic molecule that can be produced in a cell or cell extract. By blotting based assay, it is referred to any experimental procedure that involves transferring and immobilizing biomolecules on a membrane or thin film for subsequent processing.

Figure 1A:
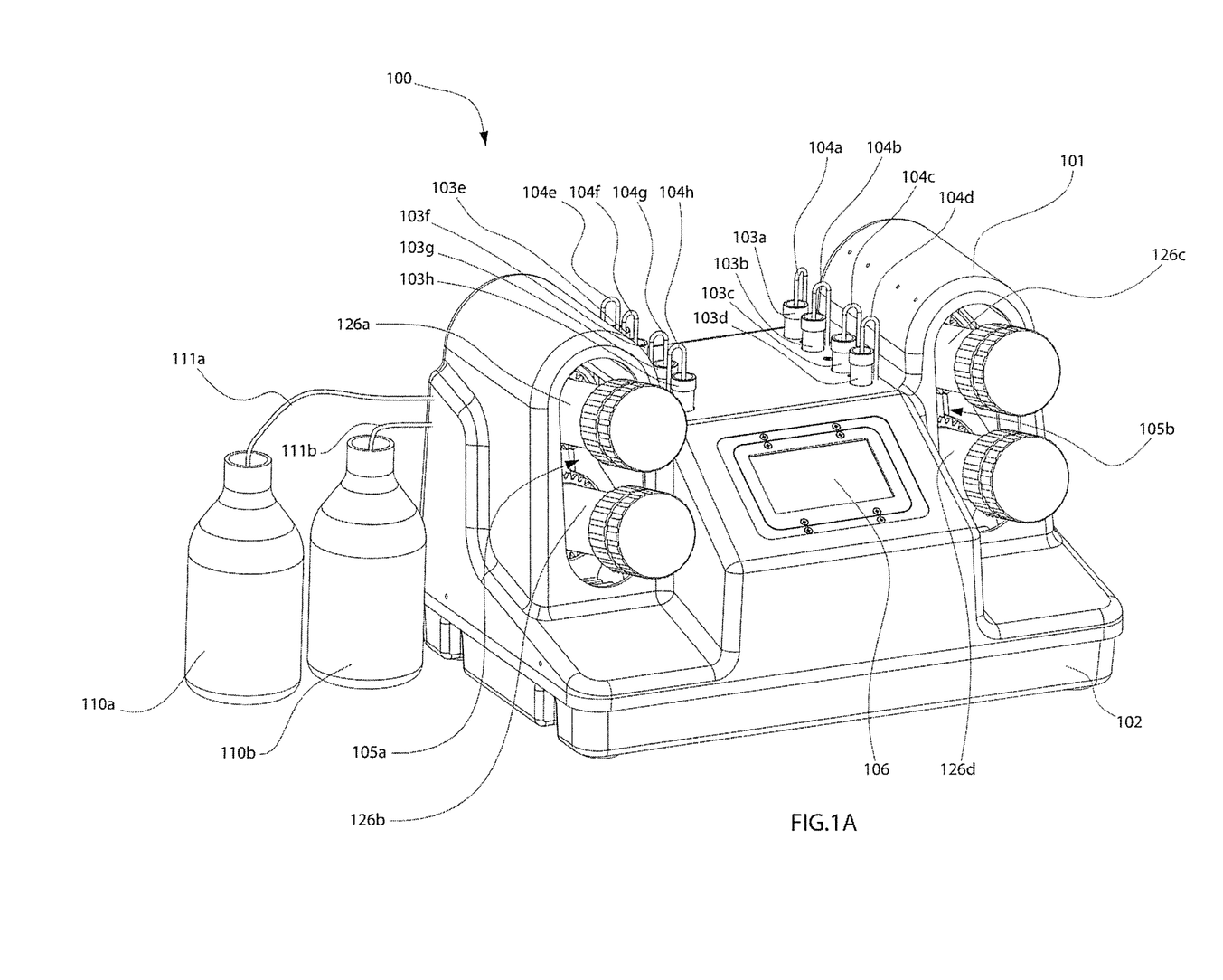
FIG. 1A shows the device 100 for western blot membrane processing in accordance with the present invention.
Figure 1B:
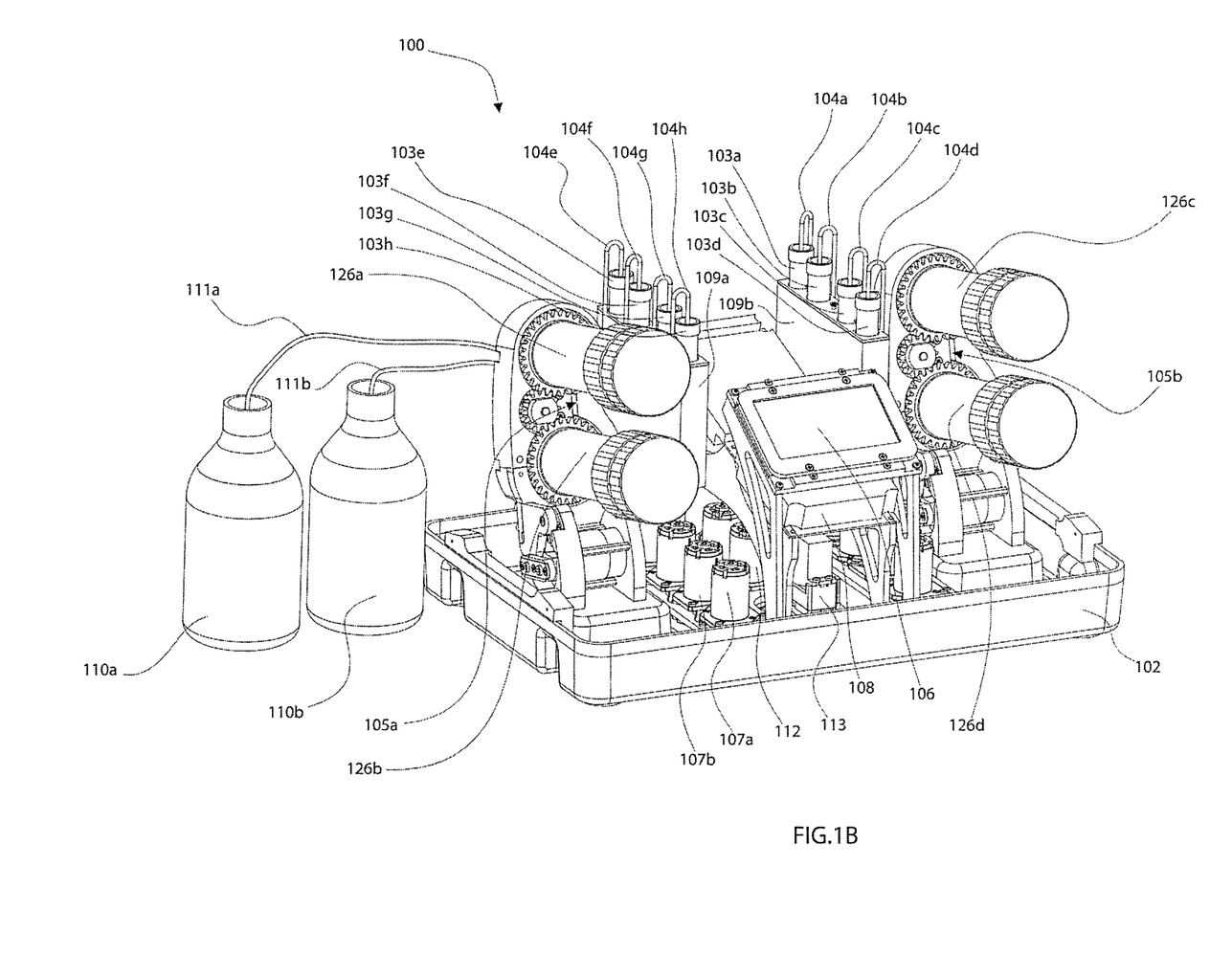
FIG. 1B shows the device 100 for western blot membrane processing without the cover 101, revealing the major components of the device 100.

The device 100 for automated western blot membrane processing is constructed in accordance with the present invention. As shown in FIG. 1A, components of the device 100 are mounted on the baseplate 102 and covered by the cover 101. It should be noted that the baseplate 102 and cover 101 may have various shapes. Several major components are protruding through the holes in the cover 101 of the device 100. Such protruding components are reagent storage containers 103 together with inserted tubing 104, containers 110 for bulk solutions with inserted hose 111 as well as the reaction vessel assembly 105. Furthermore, the device 100 must comprise at least one reagent storage container 103. For example, for western blot membrane processing, preferably each cylinder 126 within each reaction vessel assembly 105 is connected with at least one, and preferably two reagent storage containers 103. In another embodiment, as shown in FIGS. 1A and 1B, the device 100 comprises eight reagent storage containers 103a, 103b, 103c, 103d, 103e, 103f, 103g, 103h for holding the reagents, such as antibody solutions, etc, together with inserted tubing 104a, 104b, 104c, 104d, 104e, 104f, 104g, 104h (FIG. 1A). Any storage container can be used as the reagent storage container 103 and it can be manufactured from a wide variety of materials including plastics, glass and metals. In addition, the device 100 also comprises at least one container 110 for bulk solutions, such as washing buffer, waste solution, distilled water, etc. The device 100 preferably contains three containers 110 for bulk solutions such as washing buffer and/or distilled water, and/or liquid waste, depending on particular use. In another embodiment, when treating the membrane during a typical western blot assay, the device 100 contains two containers 110*a*, 110*b* for bulk solutions, for holding washing buffer and liquid waste as shown in FIG. 1B.

The device 100 may further comprise at least one pump 112 (FIG. 11B) for pumping the liquid reagents to and from the container 110 for bulk solutions via hose 111. As shown in FIG. 1A, each container 110 holding the bulk solution is equipped with a hose 111 for transferring the liquid reagents to and from the container 110 for bulk solutions. The device 100 also comprises at least one reaction vessel assembly 105. Preferably, the device 100 comprises two reaction vessel assemblies 105*a* and 105*b*, as shown in FIG. 1A. It is also possible to design the device 100 having various and not limited numbers of reaction vessel assemblies 105, as needed. The device 100 is programmed, preferably through the touchscreen display 106 of the device 100. It will be understood that different means for user/device interface and programming may also be used, such as keypads with LED indicators, etc. The touchscreen display 106 is preferred as the most user friendly and flexible for programming.

FIG. 1B, illustrates the device 100 after the removal of the cover 101 from the device 100, thus revealing the layout of major components of the device 100. Furthermore, FIG. 1B, illustrates reagent storage containers 103*a*, 103*b*, 103*c*, 103*d*, 103*e*, 103*f*, 103*g*, 103*h* for holding the reagents, such as antibodies, etc. together with inserted tubing 104*a*, 104*b*, 104*c*, 104*d*, 104*e*, 104*f*, 104*g*, 104*h*. Further, the appropriate reagent storage container holders 109*a*, 109*b* have also been shown in FIG. 1B.

Each reagent storage container 103 comprises inserted tubing 104 for transferring the liquid reagent to the cylinder 126. The inserted tubing 104 is preferably connected with at least one pump 107 for pumping the reagents between one or more reagent storage containers 103 and one or more cylinders 126. Preferably, the pump 107 is a peristaltic pump. In another embodiment, the device 100 comprises several pumps for pumping the reagents between one or more reagent storage containers and one or more cylinders 126. Preferably, each cylinder 126, e.g. cylinder 126*a* is connected with two reagent storage containers 103, e.g. 103*a* and 103*b* by two pumps 107 e.g. 107*a* and 107*b* as shown in FIG. 1B.

It should be noted that any type of pump or mechanism can be used to dispense and remove the liquid to and from various containers within the device 100.

The device 100 may further contains at least one one-way or multi-way valve 113 which may be controlled by e.g. servo motors, linear actuator, etc. Valve 113 serves to appropriately guide, i.e. direct the addition and removal of the liquid between containers 110 for bulk solutions and cylinders 126.

In addition, the automated addition and removal of liquid solutions by the pump 112 and/or valve 113, as well as the user/device interface and programming are controlled by e.g. a single printed circuit board (PCB) or any other similar means 108 for automatic control of the pump 112 and/or valve 113. The reaction vessel assembly 105 is visible in detail in FIG. 2A.

Figure 2A:
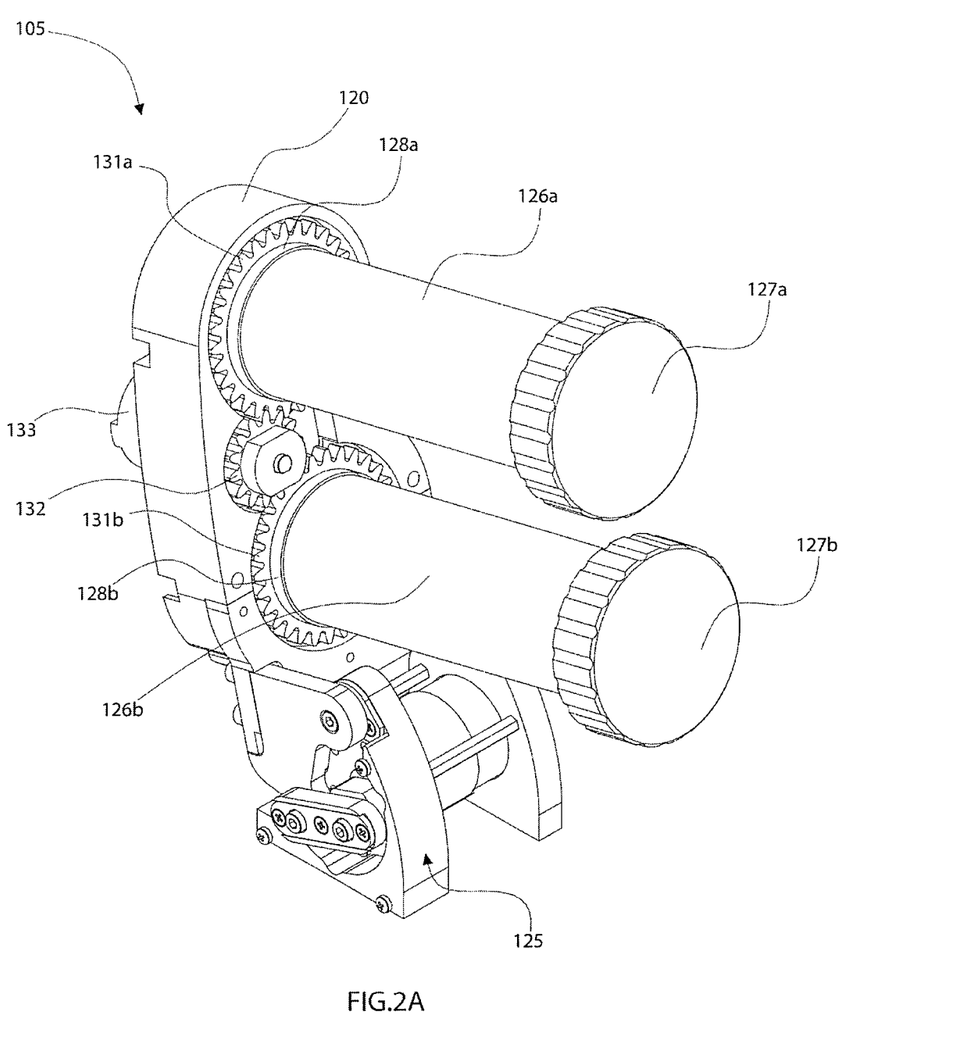
FIG. 2A shows in detail the reaction vessel assembly 105.
Figure 2B:
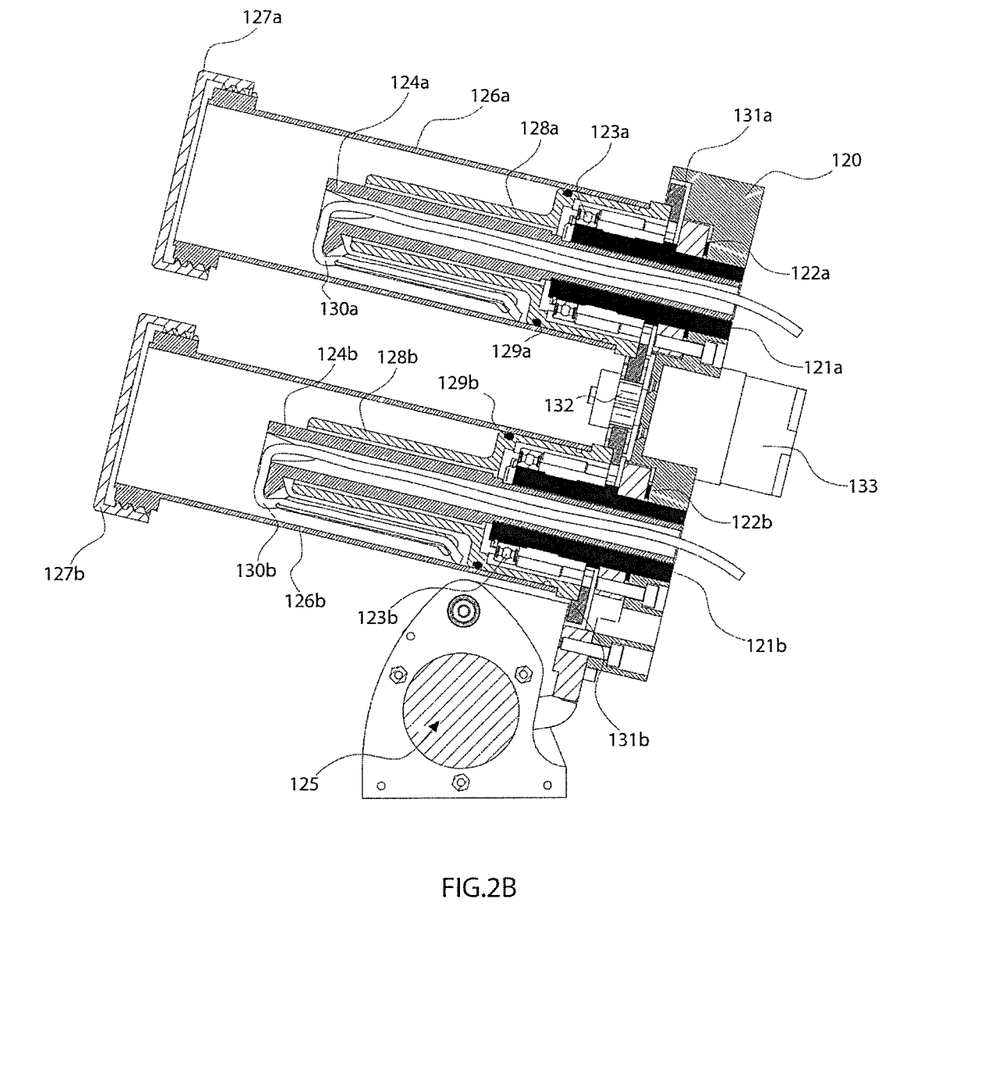
FIG. 2B shows a longitudinal section of the reaction vessel assembly 105, in the upright position.

FIG. 2A shows the isolated reaction vessel assembly 105 of the device 100, while its longitudinal section, in upright position is shown in FIG. 2B. As shown in FIG. 2B, the reaction vessel assembly 105 comprises at least one carrier 120, at least one cylinder 126 being connected with one hollow axle 121 which is mounted to the carrier 120. Each cylinder 126 contains at least one tubing carrier 124 for holding at least one appropriate tubing 130. The tubing 130 transfers the liquid reagents between the reagent storage container 103 or the container 110 for bulk solutions and the cylinder 126. In one embodiment, the carrier 120 contains two hollow axles 121*a* and 121*b*, two containers 126*a* and 126*b*, each container 126 being connected with one hollow axle 121*a* and 121*b*, respectively.

The hollow axle 121 can be mounted to the carrier by different means including a thread, tight press fitting or other similar means. In one embodiment, the hollow axle 121 passes through a hole in the carrier 120 and is tightly mounted to the carrier with an appropriate snap ring 122.

The reaction vessel assembly 105 of the device 100 further contains means 123 for enabling coaxial rotation of the cylinder 126 with the hollow axle 121. In one embodiment, the hollow axle 121 is equipped with means 123 being ball bearings. Other rolling or sliding elements can be used as well instead of the described ball bearings.

Each cylinder 126 of the reaction vessel assembly 105 of the device 100 may further contains a watertight seal 128. The watertight seal 128 has several functions. It serves as a barrier for liquids within the cylinder 126, enables coaxial rotation of the cylinder 126 because the watertight rear seal 128 serves as the housing for means 123 i.e. ball bearings, and has spur gears 131 for engagement of the means 133 for powering the rotation of the cylinder 126. In one embodiment, means 133 for powering the rotation of the cylinder 126 is a motor. The motor may comprise gear 132 engaging the spur gear 131 and subsequently rotating the whole cylinder. Instead of gear 132 engaging the spur gear 131, other mechanisms such as belt or chain drive may be used.

The watertight seal 128 comprises at least one watertight barrier 129, such as hydraulic o-rings that are fitted to the watertight seal 128. Otherwise, other components instead of o-rings can be used as well to provide a watertight barrier. The tubing carrier 124 and tubing 130 passes through the channel inside the watertight seal 128.

The cylinder 126 further contains the removable cap 127.

The cylinder 126 according to the present invention serves as the reaction vessel or incubation chamber. The membranes or appropriate samples are inserted into the cylinder 126 after the removal of the removable cap 127. In one embodiment, the removable cap 127 is threaded.

The tubing carrier 124 guides the appropriate tubing 130 inside the cylinder 126, preferably to the most appropriate place inside the cylinder 126 such as the corner of the cylinder 126. According to the present invention, the tubing carrier 124 does not rotate. Namely, the rotation must be avoided as it would twist and entangle the tubing 130 that passes through the tubing carrier 124 to the appropriate place in the cylinder 126. According to the present invention, the tubing carrier 124 is rigidly attached directly to the hollow axle 121 and is therefore stationary in relation to it. In the device 100, the tubing carrier 124 is rigidly attached to the hollow axle 121 by, for example, screws, tight press fitting, snap rings, glue or other similar attachment means. Since the tubing carrier 124 is attached directly to the hollow axle 121, and therefore to the carrier 120, it does not rotate while the cylinder 126 and the water tight back seal 128 are rotating co-axially to the hollow axle 121. Therefore, not only is the twisting and entanglement of the tubing 130 avoided, but the tubing 130 remains completely stationary inside the reaction vessel assembly 105.

Figure 2C:
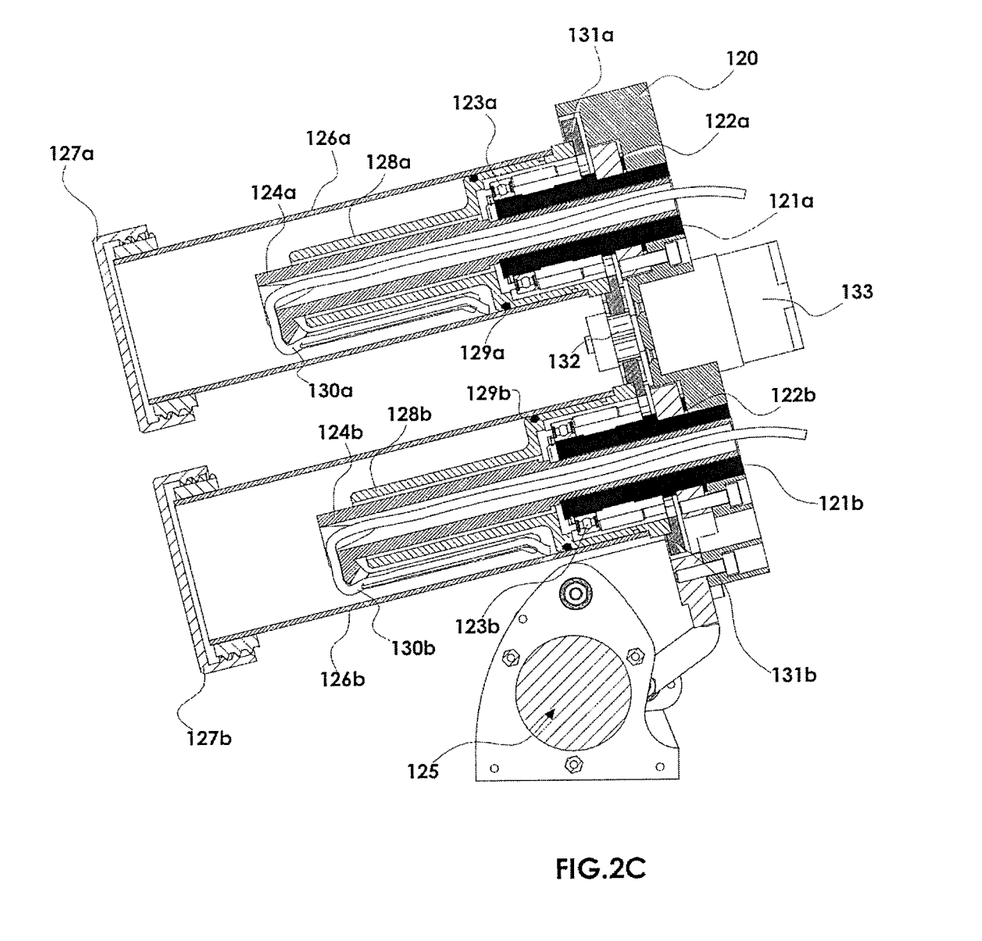
FIG. 2C shows a longitudinal section of the reaction vessel assembly 105, in the downright position.

The carrier 120 of the reaction vessel assembly 105 can be equipped with a rocking motion assembly 125. In one embodiment, a motor with an appropriate four bar linkage mechanism is used for the rocking motion assembly 125, but other mechanisms that can provide the rocking motion of the carrier 120 may also be used. In FIG. 2B, the reaction vessel assembly 105 is presented in an upright position, while in FIG. 2C, it is presented in a downright position. It would be obvious that the tubing 130 is placed in such manner to optimize removal of the liquids, while the reaction vessel assembly 105 is in the upright position. Other embodiments could use tubing placed in any other position within the cylinder 126 depending on the design of the tubing carrier 124.

The device 100 may be used for treatment in sequential order with different kinds of liquids of any kind of thin samples such as PVDF membranes or nitrocellulose membranes or nylon membranes, polyacrylamide gels, sliced tissue samples, or any kind of sample having the form of a thin layer or a film.

Method for treatment of samples, such as any kind of thin-layer samples, particularly biological samples, with liquid reagents in sequential order using the device 100 includes the following steps:

1. Placing the sample in cylinder 126, optionally with the addition of the first liquid reagent in the cylinder 126 manually
2. Closing the cylinder by the cap 127
3. Providing the liquid reagents to be used in sequential order in reagent storage containers 103
4. Providing the washing and/or rinsing solutions in containers 110 for bulk solutions
5. Choosing the appropriate program or creating a new program for establishing the protocol for sequential treatment with liquid reagents including the order of the reagents, the time of incubation with each reagent, and the number of repeated cycles, if any, as well as the option of recycling of provided reagents.

The reagents, such as antibody solutions, used in the described method can be recycled and used in multiple assays.

The bulk reagents which are not meant to be recycled, such as reagents for rinsing and washing the samples can be removed in container 110b for liquid waste.

Figure 3A:
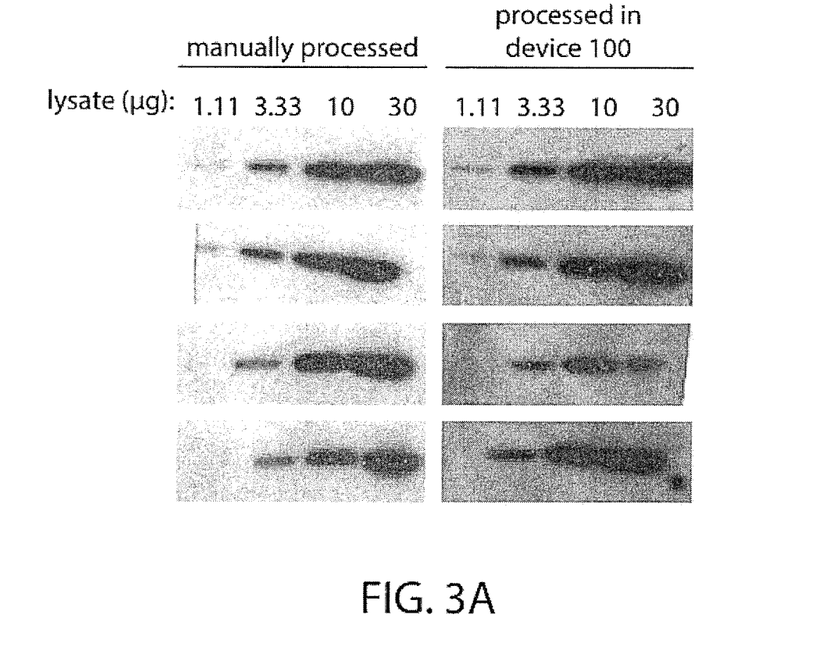
FIG. 3A shows the resulting film developed after the processing of a western blot membrane using the device 100 compared to manually processed membrane.

The device 100 was experimentally tested for western blot membrane processing. Mouse liver samples were removed, lysed, and cleared by centrifugation. Protein concentration was measured. Subsequently, samples were ran with gradually increasing protein amounts 1, 3, 10, and 30 µg of lysate. Polyacrylamide gels were run. Transfer of samples to membranes was performed using the wet blot chamber at 100V for 1 hour. The following buffers were used: 1. Blocking buffer (5% non-skimmed milk in TBS-T), washing buffer (TBS-T), Primary antibody solution (anti-tubulin WA3, 1:200 diluted in in 3% BSA in TBS-T), Secondary antibody solution (anti-mouse 1:40000 in blocking buffer). Membranes were processed with the following protocol at room temperature in the following manner: blocking buffer at room temperature for 1 hour, 3 times washed for 10 min in washing buffer, 13 hours in Primary antibody solution at 4° C., three times washed with washing buffer, secondary antibody solution at room temperature for 1 hour. Four technical replicates were performed for both manually processed and membranes processed in the device 100. The representative results are shown in FIG. 3A. Overall, this indicates that the results obtained from the device 100 are comparable to the manually processed membranes.

The invention claimed is:

1. An automated device 100 for the treatment of samples with liquid reagents in sequential order, the device 100 comprising:
   a) a baseplate 102;
   b) a cover 101;
   c) at least one reagent storage container 103;
   d) at least one container 110 for bulk solutions;
   e) at least one reaction vessel assembly 105 comprising at least one cylinder 126 for holding the sample, said cylinder 126 being closeable on one end by a removable cap 127;
   f) means 133 for powering the rotation of the cylinder 126;
   g) means 108 for automatic control of the transport of the liquid reagents from the reagent storage container 103 and container 110 for bulk solutions to the cylinder 126 and vice versa, according to the predetermined schedule
   characterized in that
      each reaction vessel assembly 105 further comprises at least one carrier 120 holding at least one hollow axle 121, each cylinder 126 within the reaction vessel assembly 105 being rotatably coupled with one hollow axle 121 and each cylinder having means 123 for enabling coaxial rotation of the cylinder 126 around the hollow axle, each hollow axle 121 having at least one tubing carrier 124 rigidly attached to it, said tubing carrier 124 entering the cylinder 126 and guiding at least one the tubing 130 for transferring the liquid reagents between the reagent storage container 103 or the container 110 for bulk solutions and the cylinder 126.

2. The automated device 100 according to claim 1, characterized in that each cylinder 126 further contains a watertight seal 128, said watertight seal 128 comprising at least one watertight barrier 129.

3. The automated device 100 according to claim 2, characterized in that, the tubing carrier 124 enters the cylinder 126 through the watertight seal 128.

4. The automated device 100 according to claim 1, characterized in that each reagent storage container 103 comprises inserted tubing 104 for transferring the liquid reagent to the cylinder 126.

5. The automated device 100 according to claim 4, characterized in that the inserted tubing 104 for transferring the liquid reagent to the cylinder 126 is connected with at least one pump 107 for pumping the reagents between one or more reagent storage containers 103 and one or more cylinders 126.

6. The automated device 100 according to claim 1, characterized in that each container 110 for bulk solution comprises inserted hose 111 for transferring the liquid reagent to and from the container 110 for bulk solution.

7. The automated device 100 according to claim 6, characterized in that the inserted hose 111 for transferring the bulk solution to and from container 110 for bulk solution is connected with at least one pump 112 for pumping the bulk solution to and from the container 110 for bulk solution.

8. The automated device 100 according to claim 1, characterized in that further comprises at least one valve 113 for directing the liquid between containers 110 for bulk solutions and cylinders 126.

9. The automated device 100 according to claim 1, characterized in that the carrier 120 is equipped with a rocking motion assembly 125.

10. Method for treatment of samples with liquid reagents in sequential order using the device 100 according to claim 1, the method including the following steps:
   1. Placing the sample in the cylinder 126;
   2. Closing the cylinder by the cap 127;

3. Providing the reagent storage containers 103 with the liquid reagents to be used in sequential order;
4. Providing the containers 110 for bulk solutions with washing and/or rinsing solutions;
5. Choosing the appropriate program or creating a new program for establishing the protocol for sequential treatment with liquid reagents, the program having the following parameters: order of reagents, the time of incubation with each reagent, the number of repeated cycles, if any, and the possibility to recycle the used reagents.

\* \* \* \* \*